Dec. 21, 1965 R. S. ELY 3,224,105
LEAD ANGLE GEAR GAGE
Filed June 11, 1963 2 Sheets-Sheet 1

INVENTOR.
ROLAND S. ELY
BY
Toulmin & Toulmin
ATTORNEYS

Dec. 21, 1965   R. S. ELY   3,224,105
LEAD ANGLE GEAR GAGE
Filed June 11, 1963   2 Sheets-Sheet 2

INVENTOR.
ROLAND S. ELY
BY Toulmin & Toulmin
ATTORNEYS

United States Patent Office 3,224,105
Patented Dec. 21, 1965

3,224,105
LEAD ANGLE GEAR GAGE
Roland S. Ely, 4393 Creek Road, Cincinnati 41, Ohio
Filed June 11, 1963, Ser. No. 287,132
7 Claims. (Cl. 33—179.5)

This invention relates to gauging devices and is particularly concerned with a gauging device for gauging gears. This application is related to my co-pending application Serial No. 287,067 filed June 11, 1963 and now abandoned.

Gears are an important and widely used item of commerce and are made in great numbers as, for example, for use in automobile transmissions and the like. Ordinarily, when gears are made on a production basis, they are run out in gear hobbing machines, and these machines run substantially continuously. When it becomes necessary to change the hobs or cutters in such machines, the cutters are put in the machines, and gears cut by the new cutters are taken therefrom and checked. The usual procedure for checking the gears is to take them to a laboratory having precision equipment therein, and to check the gears out for tooth profile, run out, defective tooth formations, such as nicks and the like, and, in the case of skew gears, for lead angle. A check of this nature will take considerable time, up to an hour or more, and it is impractical to shut down the gear hobbing machine during this period.

The need has thus long existed for a device that could be employed at the machine for making a quick accurate check of the gears being cut on the machine so that it could quickly be determined whether or not a machine provided with a new cutter was producing proper gears. The provision of such a device would improve the quality of the gears, would reduce scrap of the gears themselves, and would reduce the re-operating of transmissions and the like built up and including defective gears therein.

With the foregoing in mind, it is a particular object of the present invention to provide a gauge or checking unit of the nature referred to which can be employed at the machine which is cutting gears for effecting a quick but nevertheless accurate determination of the principal characteristics of the gears being cut.

Another object of this invention is the provision of a highly accurate but nevertheless compact checking device of the nature referred to, and which is inexpensive enough that a number thereof could be provided in a large shop so that gear checking could be accomplished and without the customary delay that has heretofore been encountered.

A still further object of this invention is the provision of a compact inexpensive and accurate gear checking arrangement which employs amplifying indicating devices so that accurate results can be obtained quickly, and which results can readily be observed.

These and other objects and advantages of this invention will become more apparent upon reference to the following specification taken in connection with the accompanying drawings, in which.

Figure 1:
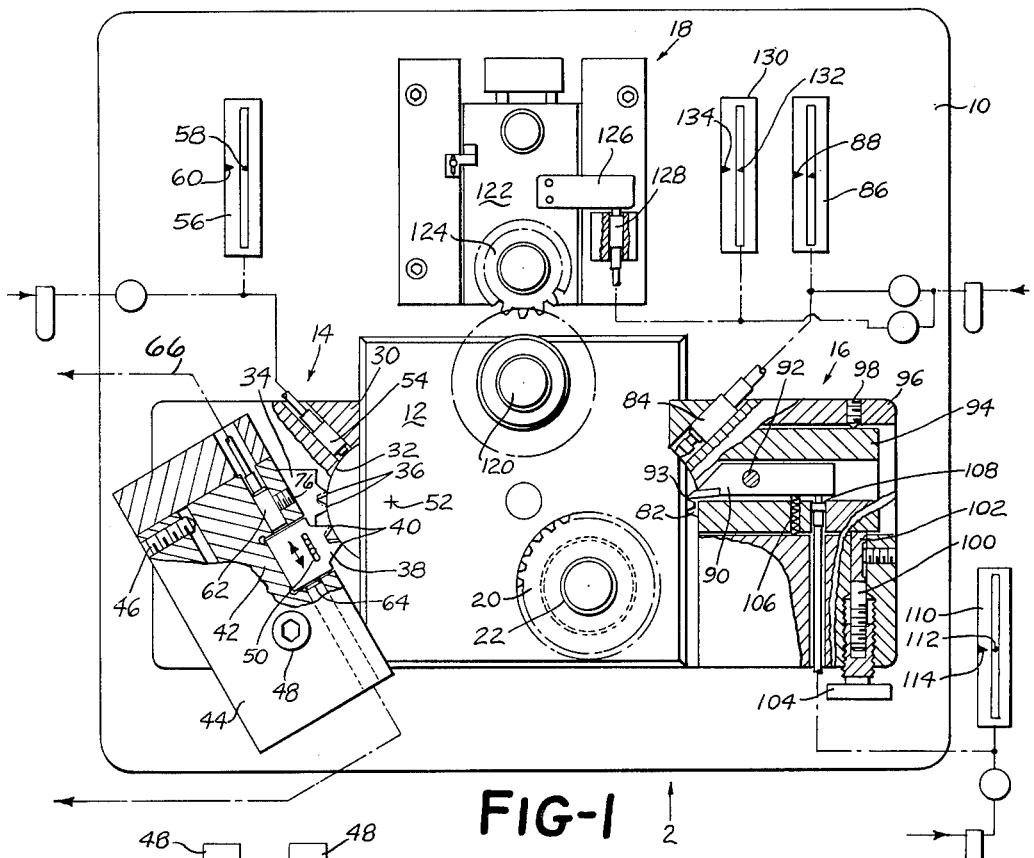
FIGURE 1 is a plan view of an arrangement according to the present invention somewhat diagramamtically illustrating the gear checking unit and partly in section.
Figure 2:
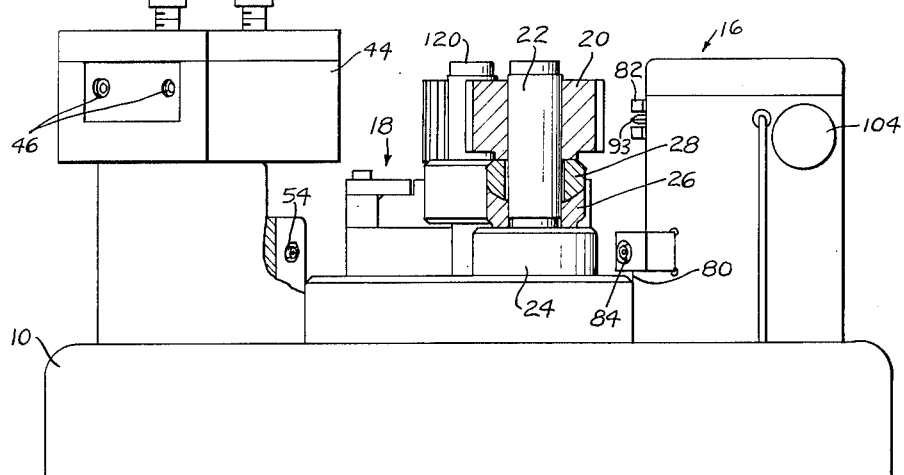
FIGURE 2 is a view looking in at the device as indicated by arrow 2 on FIGURE 1.

Referring to the drawings more in detail, a device according to the present invention comprises a base member 10 on which is mounted a smooth hardened surface plate element 12. Grouped around surface plate element 12 is a lead angle checking station generally indicated at 14, a tooth profile checking station, generally indicated at 16, and a run out and nick detector station, generally indicated at 18.

The gear to be tested is identified at 20, and it is mounted on an arbor 22 that is fixedly supported on a base element 24 which has a smooth flat lower surface so as to be slidable on surface plate element 12. Base element 24 is circular, and its diameter is equal to the base circle diameter of gear 20. Arbor 22 is fixed to base element 24 in the center and the axis of the arbor is perpendicular to the lower surface of base element 24.

Mounted around arbor 22 is a first collar 26 having a spherical recess in the top, and resting in the spherical recess is a spherical member 28 which abuts the bottom of gear 20, thereby to locate it on the arbor. Member 28 is freely shiftable on collar 26 to provide a seat against which the bottom of the gear abuts so that there is no tendency whatever for the gear to be tilted on the arbor.

With the gear mounted on arbor 22, the lead angle of the gear can be checked in station 14 by sliding the gear and its support into position adjacent lead angle checking station 14. This station includes a block 30 having a circular recess 32 therein for receiving base element 24. Stationarily mounted on block 30 adjacent the bottom of gear 20 is a toothed member 34 having a pair of teeth 36 between which one of the teeth of the gear 20 can be received. Positioned near the top of gear 20 is another toothed member 38 also having a pair of teeth 40 between which the same tooth of gear 20 is received that is engaged by teeth 36 of member 34.

Toothed member 38 is slidably guided in a support block 42, and this block is adjustable in a supporting frame 44 by means of adjustment screws 46, and can be clamped fixedly in adjusted position by clamp screws 48.

Toothed member 38 is arranged to be shiftably guided in its support block in a direction tangential to the gear which it engages as by the pin and slot means 50.

For precisely positioning base element 24 so that the center of arbor 22 and, therefore, of gear 20 mounted thereon falls exactly on the center point indicated at 52, block 30 is provided with variable air nozzle means 54 connected in circuit with an indicating air gauge 56. This gauge is so calibrated and adjusted that when the movable element 58 thereof is aligned exactly with gauge point 60, base element 24 will be positioned with the axis of arbor 22 passing through point 52. At this time, of course, teeth 36 of member 34 engage one of the teeth of gear 20, and this engagement of the gear, together with the air gauge arrangement described provides for precise positioning of the gear bodily and circumferentially. The position occupied by toothed member 38 will thus give a reliable indication of the lead angle of the tooth of the gear engaged by teeth 36 and 40.

The exact position of the toothed member 38 is determined by the effect that this member has on the nozzles 62 and 64, which are similar to the aforementioned nozzle 54, and which are connected in circuit with an indicating air gauge means.

Figure 3:
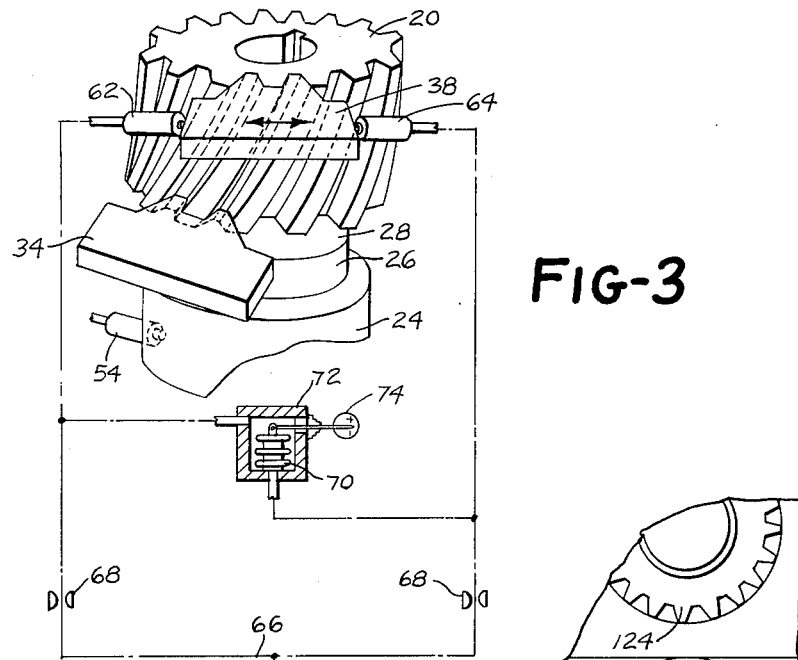
FIGURE 3 is a somewhat diagrammatic perspective view showing the arrangement for checking the lead angle of the gear.
Figure 4:
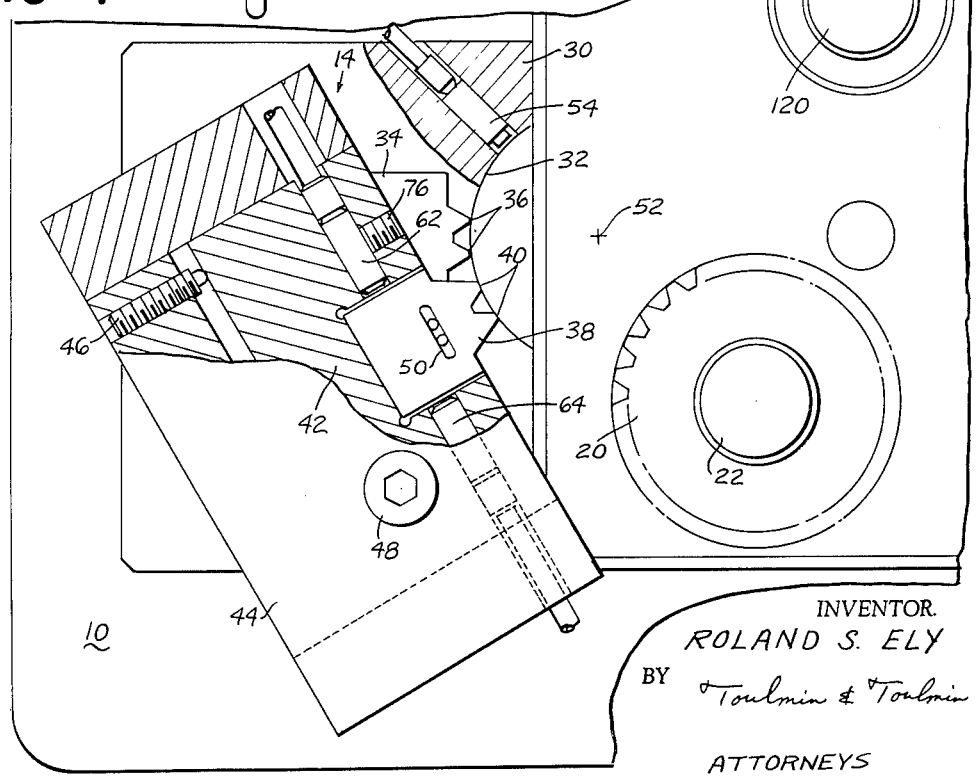
FIGURE 4 is a fragmentary plan view drawn at enlarged scale showing more in detail the lead angle checking station.

A typical air gauge circuit employing nozzles 62 and 64 is illustrated in FIGURE 3, wherein it will be seen that there is a controlled air supply via conduit means 66 and the fixed restrictors 68, to the respective nozzles 62 and 64. The pressure downstream of the restrictor 68 in circuit with nozzle 64 is conducted to the interior of a bellows 70, whereas the pressure downstream of the restrictor 68 in circuit with nozzle 62, is communicated with the interior of casing 72 in which bellows 70 is mounted so that this pressure acts externally of the bellows. The movement of the bellows is converted to a readable indication as by means of the linkage means generally indicated at 74 so that, in this manner, the exact positioning of the toothed member 38 can be indicated and a reliable indication of the lead angle of the particular tooth being measured will be had.

In checking a gear, one or more, up to all of the teeth are checked and the exact characteristics of the gear with respect to the lead angle can readily be ascertained.

The particular air gauge circuits employed can be varied according to well known practices, and other indicating devices could also be employed for the detecting and measuring operations. I prefer to employ air gauges because they are reliable and inexpensive, and are easily read so that a checking operation on a gear can be carried out rapidly and efficiently.

The checking referred to can be carried out with such efficiency, and the apparatus is so inexpensive, that it becomes practical to provide a unit of the nature described in the shop associated with one or more hobbing machines, whereby gears can be checked quickly at any time without waiting on long and laborious laboratory procedures to be carried out.

The nozzles 62 and 64 associated with toothed member 38 are preferably adjustably supported on block 42 as by the set screw means 76 so that, after the apparatus is completely set up, these nozzles can be adjusted to give the desired air gauge reading on a master gear. This might be, for example, a zero reading indicating zero departure from the proper lead angle. With the nozzles set in this manner, departure of the lead angle from the master in one direction would produce a plus reading by the linkage 74, and departure in another direction would produce a minus reading.

While the arrangement disclosed is for one particular type of skew gear, it will be apparent that the same arrangement could be employed for other types of skew gears with more or less spiral or with spiral of the opposite hand, or could be employed in connection with straight gears if so desired. Still further, gears of any length could readily be checked in the same manner and various points along a long spiral or straight tooth could be checked by providing a movable toothed gauging element at the proper point along the tooth.

At the second checking station generally indicated at 16, the tooth profile is checked. Gears of the nature described and referred to are involute gears and the profile of each tooth corresponds substantially with an involute formed on the base circle.

In practice, in connection with many gears, including gears for automobile transmissions and the like, the tooth profile is not an exact involute, but has a somewhat raised portion over the middle part of each flank of the tooth. This raised portion is provided so that when gears are assembled together in a transmission and the transmission is run in, the wear that takes place between the inter-engaging tooth flanks until the said tooth flanks are burnished smooth, will tend to make each gear tooth a more nearly perfect involute rather than wearing the teeth down smaller than the prescribed involute form thereof. This raised portion provided on each tooth flank is thus highly important, and the measuring of the tooth profile is similarly highly important.

This measuring of the tooth profile according to the present invention is accomplished by moving the gear in its supporting fixture into station 16, and at which time, the base element 24 engages a straight surface 80, while one of the teeth of the gear is engaged by the stationary teeth 82. The exact positioning of the base element 24 along rail 80 is then effected by moving the base member along the rail so that the base element influences a nozzle 84 connected in circuit with an air gauge 86.

When the movable element of the air gauge coincides with gauge point 88, the base element 24 will be in the proper position. At this time, the gear has a predetermined angularly oriented position on account of the engagement of a tooth thereof by the aforementioned stationary teeth 82. Still further, a gauge finger 90 is at this time engaged with one flank of one of the teeth of gear 20 and the extreme tip of finger 90, indicated at 93, is engaging the tooth flank at the point where the base circle intersects the tooth flank. Finger 90 is pivoted on a pivot pin 92, and this pivot pin also pivotally connects the finger housing 94 with the stationary base portion 96.

Finger housing 94 is adjustable about the axis of pivot 92 by clamp screw 98, and the differential screw arrangement 100, the latter comprising the non-rotatably mounted but axially movable externally threaded rod 102 and the manually rotatable element 104, which is externally threaded into base member 96, which is internally threaded to receive rod 100. The internal and external threads on element 104 differ slightly in pitch so full adjustment of rod 102 can be had.

Finger 90 is biased by spring 106 to cause the tip 93 thereof to engage the tooth flank. The end of finger 90 opposite tip 93 is arranged to influence an air nozzle 108 connected in circuit with indicating air gauge 110.

After the gear has been properly positioned with respect to the gauging finger 90, as described above, the gear together with its support, consisting of arbor 22 and base element 24, is rolled along rail 80. This will cause tip 93 of the gauging finger to move over the tooth flank and measure the profile thereof. If the tooth flank is a perfect involute, there will be no movement of the gauging finger. However, any departure of the tooth flank from a perfect involute will cause movement of the finger, and this will be reflected in movement of the movable element 112 of the air gauge in one direction or the other from the fixed gauge point 114. The exact profile of the tooth flank can, in this manner, be determined with a high degree of accuracy and also very quickly.

If desired, the rail 80 and the base element 24 can be provided with inter-engaging teeth to prevent slipping of base element 24 as it is rolled along the rail. With an arrangement of this nature, some circumferential adjustment of gear 20 on arbor 22 might be necessary to get the gear properly positioned at the beginning of the profile measuring operation.

The teeth engaged by the gear in this checking station are preferably disposed both above and below the gauging finger, and thereby protect the gauging finger from accidental damage.

The final check that is made on the gear is with respect to run out and nicks on the teeth. This is accomplished by removing the gear from arbor 22 and mounting it instead on a stationary arbor 120. Arranged on base 10 adjacent stationary arbor 120 is a slidable support 122 that has rotatably mounted thereon a master gear 124. Support 122 is moved toward arbor 120 until master gear 124 meshes with gear 20 and the gears are then rotated. Any out of roundness of gear 20 or any nicks in the teeth thereof will cause movement of support 122, and this will cause the member 126 carried thereby to variably influence a nozzle 128 connected in circuit with an air gauge 130. Movement of the movable element 132 of this air gauge relative to the fixed gauging point 134 of the air gauge will thus give a ready indication of the gear characteristics with respect to gear run out or nicks, or otherwise damaged gear teeth.

The checks made of the gear are the principal characteristics that determine whether or not a gear will be suitable for use, and with the arrangement of the present invention, these characteristics can be determined quickly and accurately and at the machine immediately after the gear has been formed, and in this manner, the amount of scrap or defective gears produced is greatly reduced. The device can be used directly with hobbing machines and can be employed in connection with grinding or finishing machines, or at any point during the manufacture and handling of the gear up to the time that it is finally assembled in a unit with other gears.

It will be understood that this invention is susceptible to modification in order to adapt it to different usages and conditions; and accordingly, it is desired to comprehend such modifications within this invention as may fall within the scope of the appended claims.

What is claimed is:

1. A gear checking device comprising; a lead angle checking station, a tooth profile checking station, a surface plate between said stations, an arbor for receiving a gear and having a base slidably resting on the surface plate and supporting the arbor perpendicular to the surface plate, said arbor being slidably movable on the surface plate for positioning a gear on the arbor in either of said stations, toothed means in each station to mesh with at least one tooth of the gear and thereby locate the gear circumferentially and to locate the gear axis on a first predetermined line, locating means in each station angularly disposed relative to said toothed means operable to locate said gear axis on a second predetermined line intersecting said first line, and gauging means in each station engaging a tooth of the gear for measuring a characteristic thereof.

2. A gear checking device comprising; a lead angle checking station, a tooth profile checking station, a surface plate between said stations, an arbor for receiving a gear and having a base slidably resting on the surface plate and supporting the arbor perpendicular to the surface plate, said arbor being slidably movable on the surface plate for positioning a gear on the arbor in either of said stations, toothed means in each station to mesh with at least one tooth of the gear and thereby locate the gear circumferentially and to locate the gear axis on a first predetermined line, locating means in each station angularly disposed relative to said toothed means operable to locate said gear axis on a second predetermined line intersecting said first line, and gauging means in each station engaging a tooth of the gear for measuring a characteristic thereof, said arbor base being circular and said locating means being influenced by said base to effect the locating of the gear axis on said second line.

3. In a gauging device for gauging the lead angle of a gear; a horizontal surface plate, a vertical arbor having a base slidable on the surface plate and operable for supporting a gear coaxially with the arbor, a first toothed element stationarily mounted at about the level of the bottom of a gear when it is supported on the arbor and engageable with a tooth of the gear, a stationarily mounted first indicator means operable by said base when said tooth is engaged by said first element to indicate when the axis of the base and gear occupy a predetermined position, a second toothed element mounted in the region of the top of the gear engageable with said tooth and movable laterally relative to the said tooth, and second indicator means operable by said second element for indicating the amount and direction of movement of said second element from a predetermined position.

4. A gauging device according to claim 3 in which said base is circular and coaxial with said arbor.

5. A gauging device according to claim 3 in which said indicator means is in the form of air gauge means.

6. A gauging device according to claim 3 in which said arbor includes a collar abutting the bottom of the gear and angularly adjustable on the arbor so the gear will be supported on the arbor without tilting.

7. In a gauging device for gauging the lead angle of a gear; a horizontal surface plate, a vertical arbor having a base slidable on the surface plate and operable for supporting a gear coaxially with the arbor, a first toothed element stationarily mounted at about the level of the bottom of a gear when it is supported on the arbor and engageable with a tooth of the gear, a stationarily mounted first indicator means operable by said base when said tooth is engaged by said first element to indicate when the axis of the base and gear occupy a predetermined position, a second toothed element mounted in the region of the top of the gear engageable with said tooth and movable laterally relative to the said tooth, and second indicator means operable by said second element for indicating the amount and direction of movement of said second element from a predetermined position, said second indicator means comprising a differential air gauge having first and second variable nozzles respectively inversely influenced by movement of said second element.

References Cited by the Examiner

UNITED STATES PATENTS

| | | | |
|---|---|---|---|
| 1,281,805 | 10/1918 | Metzger | 33—147 |
| 1,961,663 | 6/1934 | Goulder | 33—179.5 |
| 2,060,518 | 11/1936 | Miller | 33—179.5 |
| 2,367,004 | 1/1945 | Chitwood | 33—179.5 |

ISAAC LISANN, *Primary Examiner.*

LEONARD FORMAN, *Examiner.*